United States Patent
Lauer et al.

(10) Patent No.: US 6,758,283 B2
(45) Date of Patent: Jul. 6, 2004

(54) AERATOR DEVICE

(75) Inventors: G. Kent Lauer, Lee's Summit, MO (US); Lyman D. Hannah, Warrensburg, MO (US); David O. Locascio, Independence, MO (US); Holland A. Mertell, Independence, MO (US)

(73) Assignee: Billy Goat Industries, Inc., Lees Summit, MO (US)

( * ) Notice: Subject to any disclaimer, the term of this patent is extended or adjusted under 35 U.S.C. 154(b) by 0 days.

(21) Appl. No.: 10/105,551

(22) Filed: Mar. 25, 2002

(65) Prior Publication Data

US 2003/0178207 A1 Sep. 25, 2003

(51) Int. Cl.[7] .............................................. A01B 45/02
(52) U.S. Cl. ........................ 172/22; 172/123; 172/125; 172/540
(58) Field of Search ............................ 172/21, 22, 123, 172/122, 119, 118, 125, 590, 556, 557, 554, 555, 542

(56) References Cited

U.S. PATENT DOCUMENTS

| | | | | |
|---|---|---|---|---|
| 1,509,652 A | * | 9/1924 | Johnson ....................... | 172/122 |
| 3,375,879 A | * | 4/1968 | Troyer et al. ................ | 172/122 |
| 3,498,385 A | * | 3/1970 | Chenweth ................ | 172/122 X |
| 3,739,965 A | * | 6/1973 | Jespersen et al. | |
| 3,824,746 A | * | 7/1974 | Watt | |
| 4,535,645 A | * | 8/1985 | De Bisschop et al. ........ | 74/492 |
| 5,850,882 A | * | 12/1998 | Link ............................ | 172/41 |
| 6,367,561 B1 | * | 4/2002 | Firdaus ................... | 172/123 X |

* cited by examiner

*Primary Examiner*—Christopher J. Novosad
(74) *Attorney, Agent, or Firm*—Spencer Fane Britt & Browne LLP; Kyle L. Elliott

(57) ABSTRACT

An aerator is provided having a front axle, including a differential and a tine wheel assembly which may be raised from the ground during maneuvers of the aerator while power continues to be supplied to the front axle, and a tine wheel assembly is provided which allows the operator to repair and change the configuration of the tines of the tine wheel assembly.

20 Claims, 11 Drawing Sheets

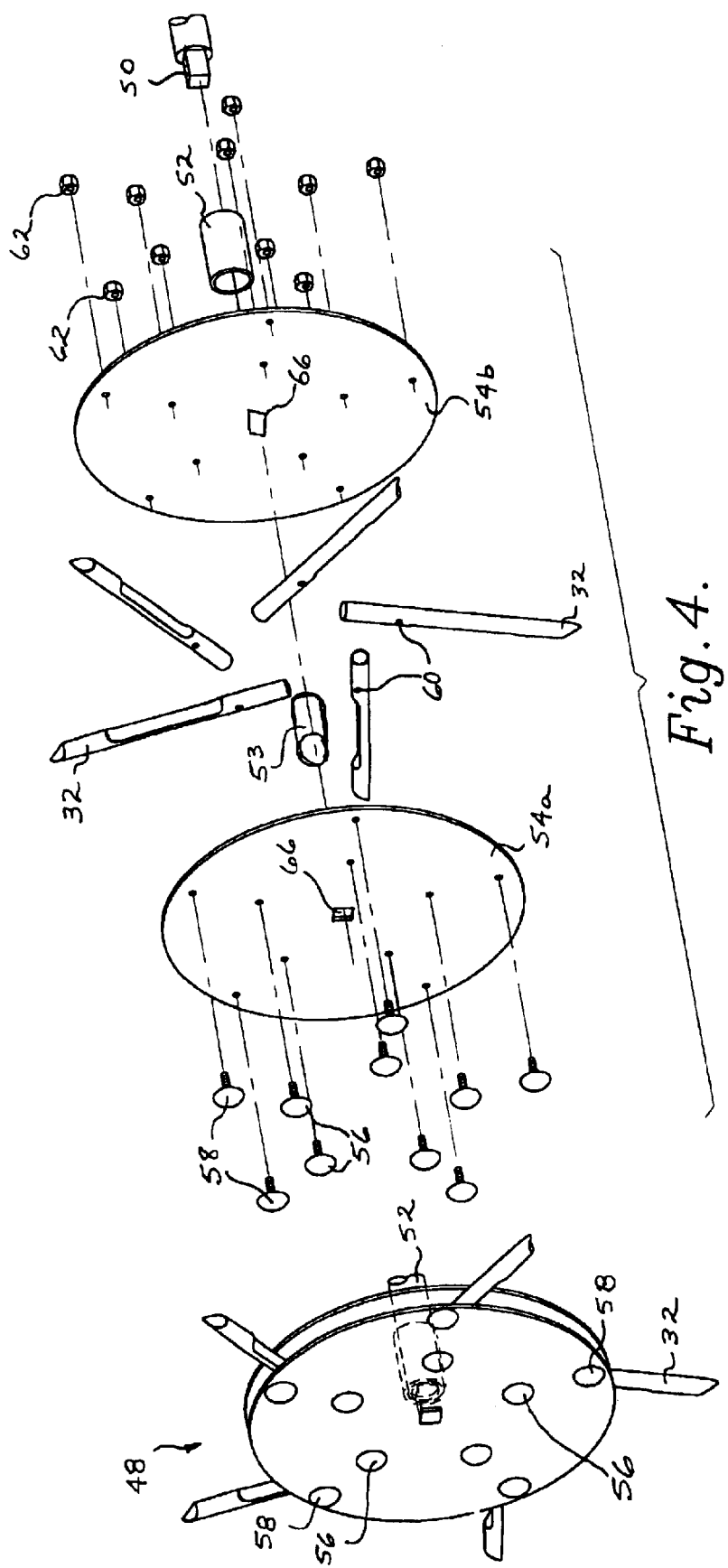

AERATOR DEVICE

BACKGROUND OF THE INVENTION

The present invention relates to lawn and garden equipment, in particular, the present invention relates to a lawn apparatus known as an aerator. Aerators are generally used to punch holes in soil or to remove cores from soil of approximately one half inch in diameter and three inches long to allow air and moisture and nutrients to enter the soil.

Several problems are present in existing aerators. The most common form of aerator has a reel or a tine assembly equipped with coring tubes or tines that are positioned on the reel or the tine assembly so they extend radially outwardly from the central shaft of the reel. The tines or coring tubes, in addition to providing aeration, provide propulsion for the aerator. As the assembly rotates, the tines rotate and punch into the ground to remove a core from the ground and also push the aerator forward. This arrangement provides excellent traction to propel the aerator along the lawn. However, it presents a substantial impediment to turning the device in a sharp turn, or to making a turn of sufficiently small radius to allow the operator of the aerator to make a second pass across the lawn immediately laterally adjacent to the previous pass. Typically, to accomplish a small radius turn, the user must expend substantial effort to force the aerator into position by lifting the front wheels or rear wheels of the aerator with the handle to remove the tines from the ground and to allow pivoting on one of the aerator wheels. Alternatively, if the tines are left in contact with the ground and allowed to propel the aerator, a turn having a large radius—on the order of eight to ten feet—only can be accomplished. As aerators typically weigh between two and three hundred pounds, the repetitive lifting of the device by the operator can be exhausting to the operator. This can present a serious problem during the operation of a reasonably dangerous piece of equipment.

Yet another problem that exists with current aerators is the assembly of the plugging or coring tines on the reel or tine assembly of the aerator. Typically, aerators have coring tines which are sandwiched between parallel mounting plates. The tines are held in place by bolts passing through the mounting plates and through the tines. The mounting plates are then, typically, welded onto a shaft or a tube which is then mounted onto a shaft to comprise the coring tube reel. It is very difficult, if not impossible, for a user of the device to replace individual components of such a welded tine wheel assembly. In addition, the connection of the tine wheel assembly to the frame of the aerator makes it difficult for a user to remove the tine wheel assembly if it is possible to replace any parts of the tine wheel assembly.

Therefore, it would be an advantage, and is an object of the present invention to provide an aerator which allows the user to change the direction of travel of the aerator while reducing the need to manually lift the aerator tines out of contact with the ground.

Yet another object of the present invention is to provide an aerator that offers a much smaller turning radius and allows the user to re-position the aerator on the reverse line of travel adjacent to the previous line of travel with greatly reduced effort by the operator and without the need to lift and pivot the aerator to achieve pivoting on the front support or wheel of the aerator.

Another object of the present invention is to provide a tine assembly which is easily removable from the aerator and which allows the operator of the aerator to easily change the type of tine which is mounted on the aerator and the number of tines and the spacing between individual tine wheels to allow near complete user selection of the type of aeration process being achieved. It would be a great benefit to users and the small equipment rental industry if an aerator was provided with a easily removable tine wheel assembly which allowed the user to replace any damaged part of the tine wheel assembly.

Yet another object of the present invention is to provide an aerator having a differential in the front axis of the device to allow great maneuverability of the aerator as it is operated.

Another object of the present invention is to provide a front axle having a differential in combination with castered rear wheels to further improve the maneuverability of the aerator.

SUMMARY OF THE INVENTION

The present invention provides an aerator having a tine wheel assembly which is easily removable by an operator. Further, the present invention provides a tine wheel assembly which allows the operator to change the spacing between tine wheels and to change the number and type of tines included in each tine wheel and to individually replace tines which have become damaged. A differential is provided in the front axle to increase maneuverability and to allow the user to reduce the need for manually lifting the aerator by its handle in order to and to reduce the need to remove the tine wheels from contact with the ground during the maneuvering of the aerator. The present invention also provides a combination of a front axle differential with castered rear wheels to assist in maneuverability of the device. Further, the present invention allows the tine wheel assembly to be raised from contact with the earth while power is supplied to the differential of the front axle to assist in maneuverability of the present invention. Another feature of the present is a non-welded, easily removable tine wheel assembly which permits the user to easily replace components of the assembly.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention.

DESCRIPTION OF THE DRAWINGS

FIG. 3 is a front and right side perspective view of a tine wheel;

FIG. 4 is an exploded view of the tine wheel shown in FIG. 3.

DESCRIPTION OF THE PREFERRED EMBODIMENT

Figure 1:
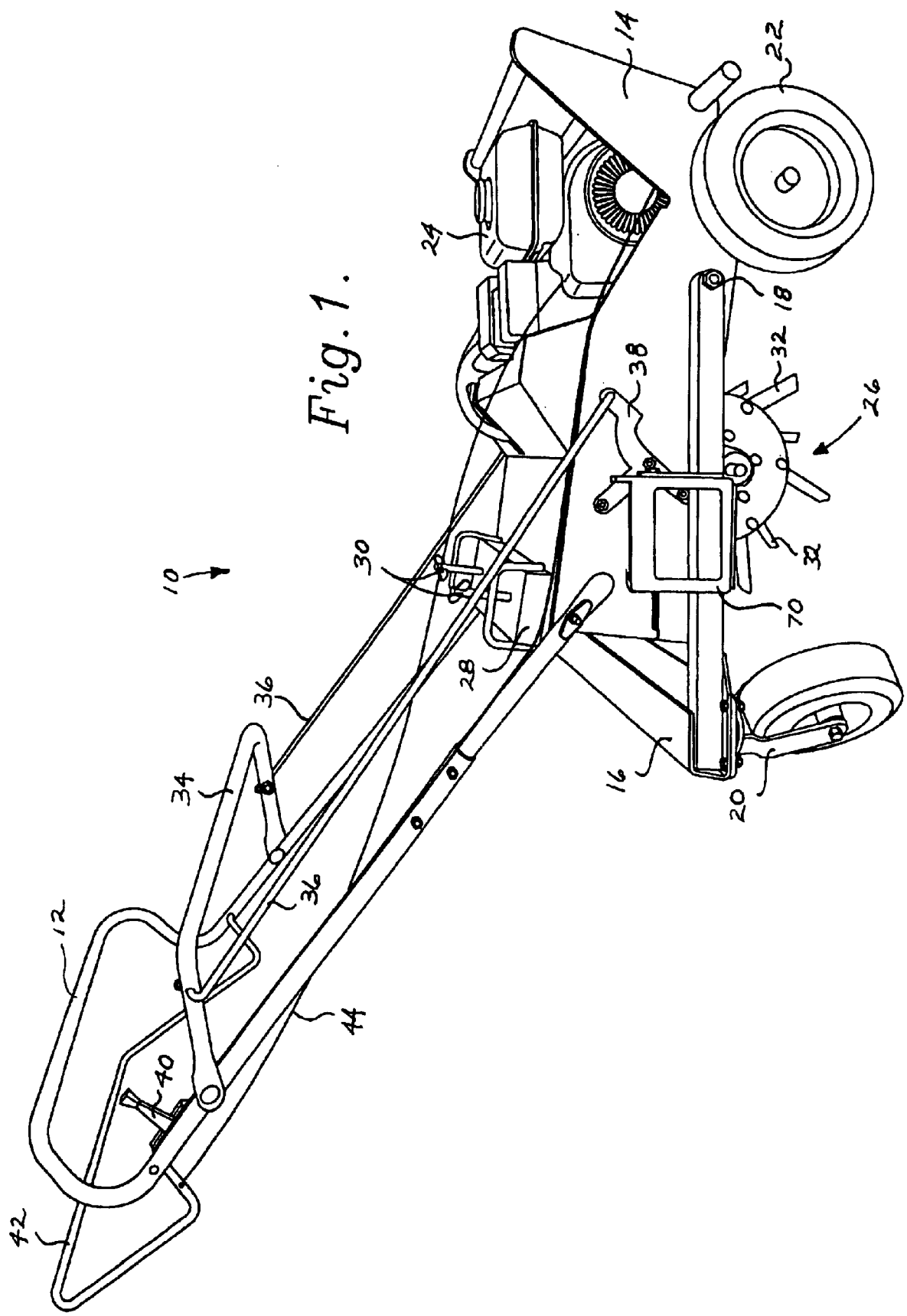
FIG. 1 is the right side and top perspective view of the aerator of the present invention.

Referring now to FIG. 1, the preferred embodiment of the present invention is shown as aerator 10. In its general configuration, aerator 10 is comprised of handle 12 which is attached to front frame 14 which contains the operational components of aerator 10. Attached to front frame 14 is rear frame 16 which is pivotally connected to front frame 14 by bolts 18. Castered wheels 20 are connected to rear frame 16 and allow the rear of aerator 10 to be easily moved any direction while relying on one of non-castered wheels 22 to act as a pivot for the move of castered wheels 20. Front frame 14 also holds engine 24 which provides the power for forward movement of aerator 10 and which provides the power for rotation of tine wheel assembly 26. Also mounted on front frame 14 is weight 28 which is fitted onto weight pins 30. Weight 28 provides additional downward force on tine wheel assembly 26 to assist in forcing tines 32 of tine wheel assembly 26 into the ground as aerator 10 is operated.

Figure 7:
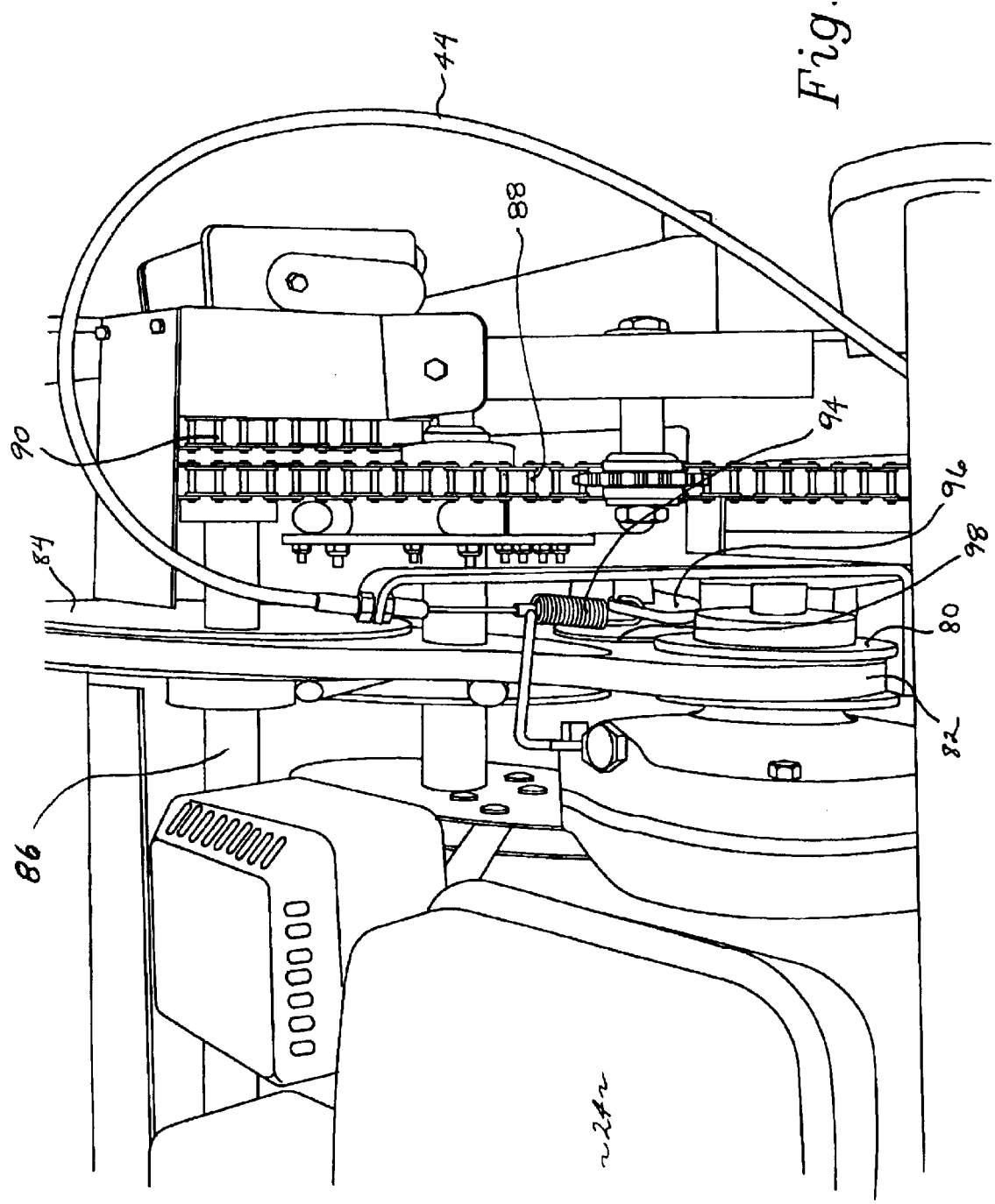
FIG. 7 is a front and top perspective view of the engine and power transfer assembly of the present invention.

Still referring to FIG. 1, aerator 10 is guided along its path by an operator grasping handle 12. Within reach of handle 12, the operator also can control rear frame lift bar 34 which is connected to rods 36 and which are attached to lift flange 38. Lift flange 38 is pivotally mounted onto front frame 14 and is movable between a first position and a second position to raise or lower rear frame 16 with respect to front frame 14. A user will wish to raise front frame 14 with respect to rear frame 16 when it is desired to disengage tine wheel assembly 26 from contact with the ground. Conversely, when the user wishes to engage tine wheel assembly with the ground, the user will pull rear frame lift bar toward handle 12 to raise rear frame 16 with respect to front frame 14 and thereby lower tine wheel assembly 26 into contact with the ground. Another component available to the user and which is mounted on handle 12 is engine throttle 40 which permits the user to advance the engine speed. Also mounted on handle 12 is power engagement bar 42 to which is attached cable 44. As will be later described, cable 44 is connected to an idler pulley which compresses and releases a belt to transfer power between engine 24 and drive shaft 86 (FIG. 7).

Figure 2:
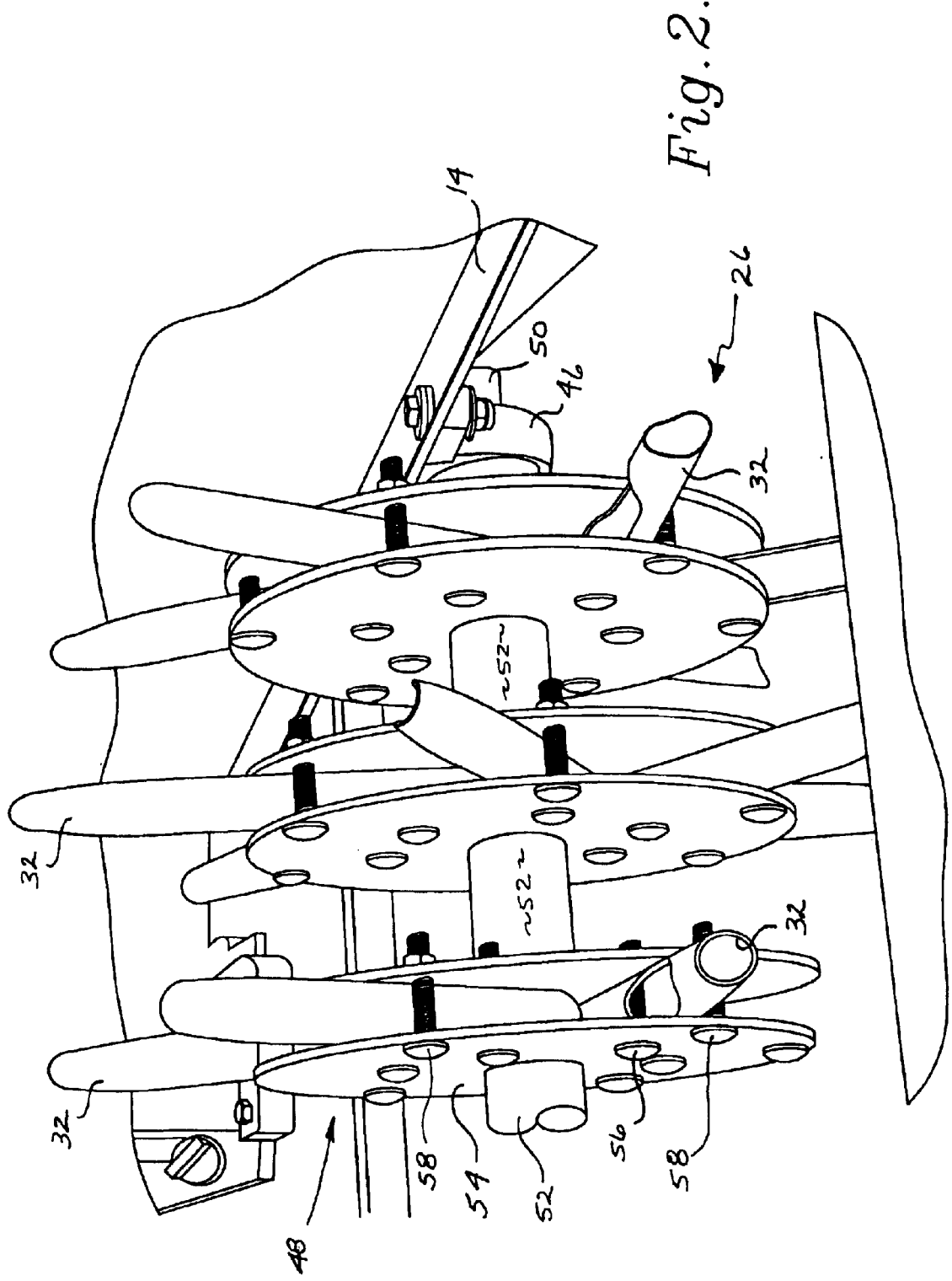
FIG. 2 is an enlarged fragmentary view of the tine wheel assembly of FIG. 8 and which is shown in FIG. 2 from a direction which is the reverse of that shown in FIG. 8.

Referring now to FIG. 2, tine wheel assembly 26 will be described in greater detail. Tine wheel assembly 26 is attached to front frame 14 by pillow bearings 46. Use of pillow bearings 46 provides the advantage that when maintenance work must be performed upon tine wheel assembly 26, the entire tine wheel assembly 26 may be removed conveniently and easily by simply unbolting pillow bearings 46 from front frame 14 and removing wheel assembly 26 from beneath aerator 10. This easy removal of tine wheel assembly 26 and is an important feature of the present invention which, among its other benefits, allows the user to replace individual tines 32 or other component of tine wheel assembly 26 which have become damaged during use of aerator 10. In addition tine wheel assembly 26 is assembled or constructed without any parts being welded together. Each part of the tine wheel assembly of the present invention can be disassembled thereby allowing the user to replace any part of the tine wheel assembly as desired.

Referring now to FIGS. 2, 3, and 4, the construction of tine wheel assembly 26 will be described in detail. Assembly 26, in general, is comprised of a number of tine wheels 48 mounted on a shaft 50. Tine wheels 48 are separated by spacers 52 which may be of whatever length the user believes to be appropriate for the work at hand. Each of tine wheels 48 is comprised of a pair of tine lock plates 54a, 54b which have secured therebetween a number of tines 32. Tine lock plates 54a, 54b are spaced apart by plate spacer 53. Plate spacer 53 protects shaft 50 and maintains tine lock plates 54a, 54b at the appropriate distance apart for the particular tine size which is mounted on tine wheel 48. Each of tines 32 is held in place between the opposed tine lock plates 54 by a single mounting bolt 56. The mounted tine 32 is further supported during operation by support bolt 58 which resists the force placed against tine 32 as tine 32 meets the ground during operation.

Referring now to FIGS. 3 and 4, the assembly of tine wheels 48 and tine wheel assembly 26 will be described. In FIG. 3, a tine wheel 48 is shown with five tines extending therefrom. It should be appreciated that a greater number or a fewer number than five tines can be assembled onto tine wheel 48. This is accomplished through the use of either providing additional mounting holes or providing alternate tine lock plates 54 which are prepared to hold a greater or lesser number of tines. It will also be appreciated that in any of such tine lock plates which are used in tine wheel 48 that the diameter of the tines can be varied depending on the type of operation being performed. For example, in some cases, the operator may simply wish to use a narrow spike to poke holes into the ground and not actually remove a core of ground as will the tines 32 shown in FIG. 4. In such a case the operator will simply change the length of spacers 52 and 53 to take-up any extra space along shaft 50.

Figure 10:
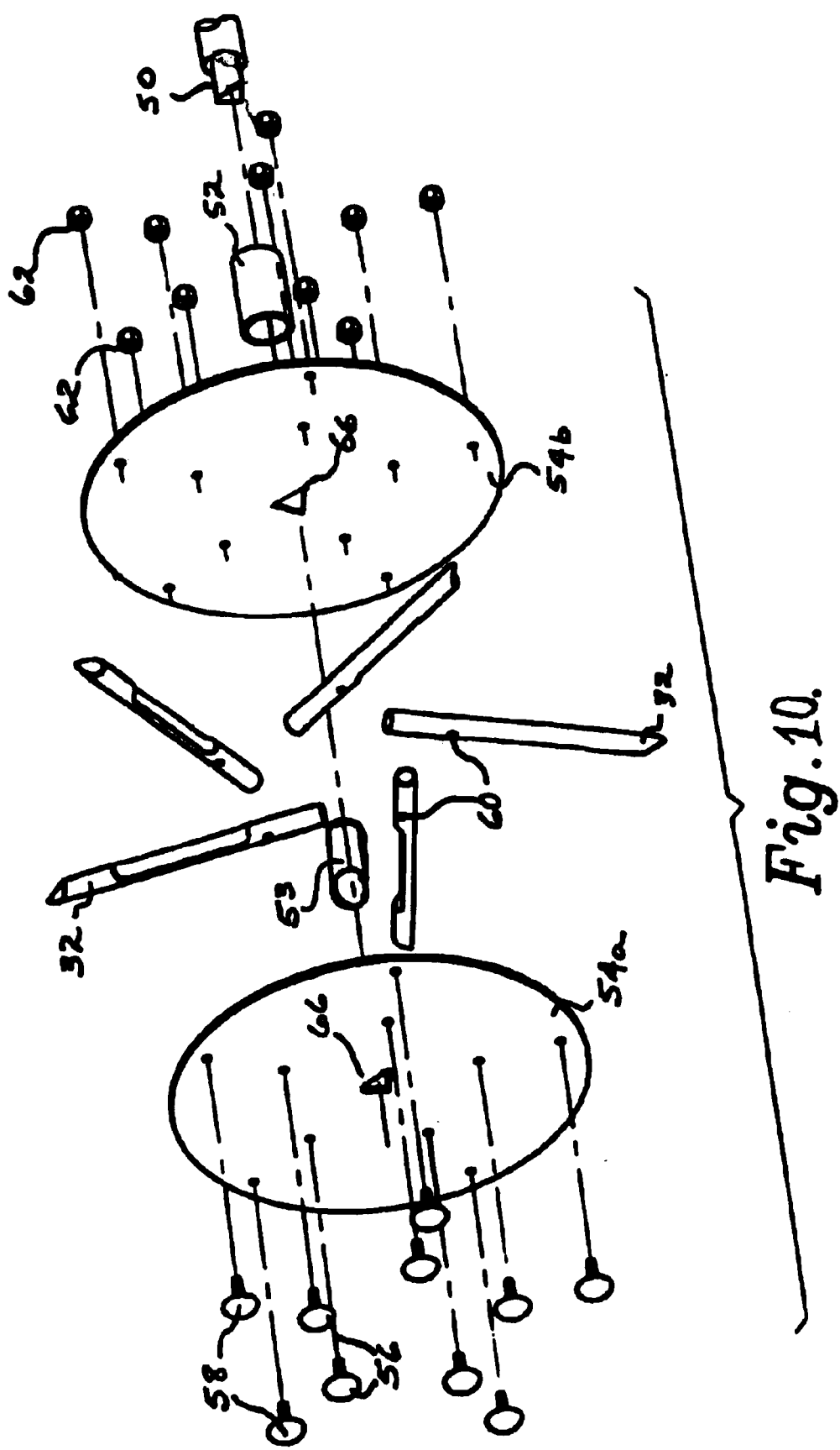
FIG. 10 is an exploded view of an alternative embodiment of the tine wheel shown in FIGS. 3 and 4 in which the shaft is triangular in cross-section.
Figure 11:
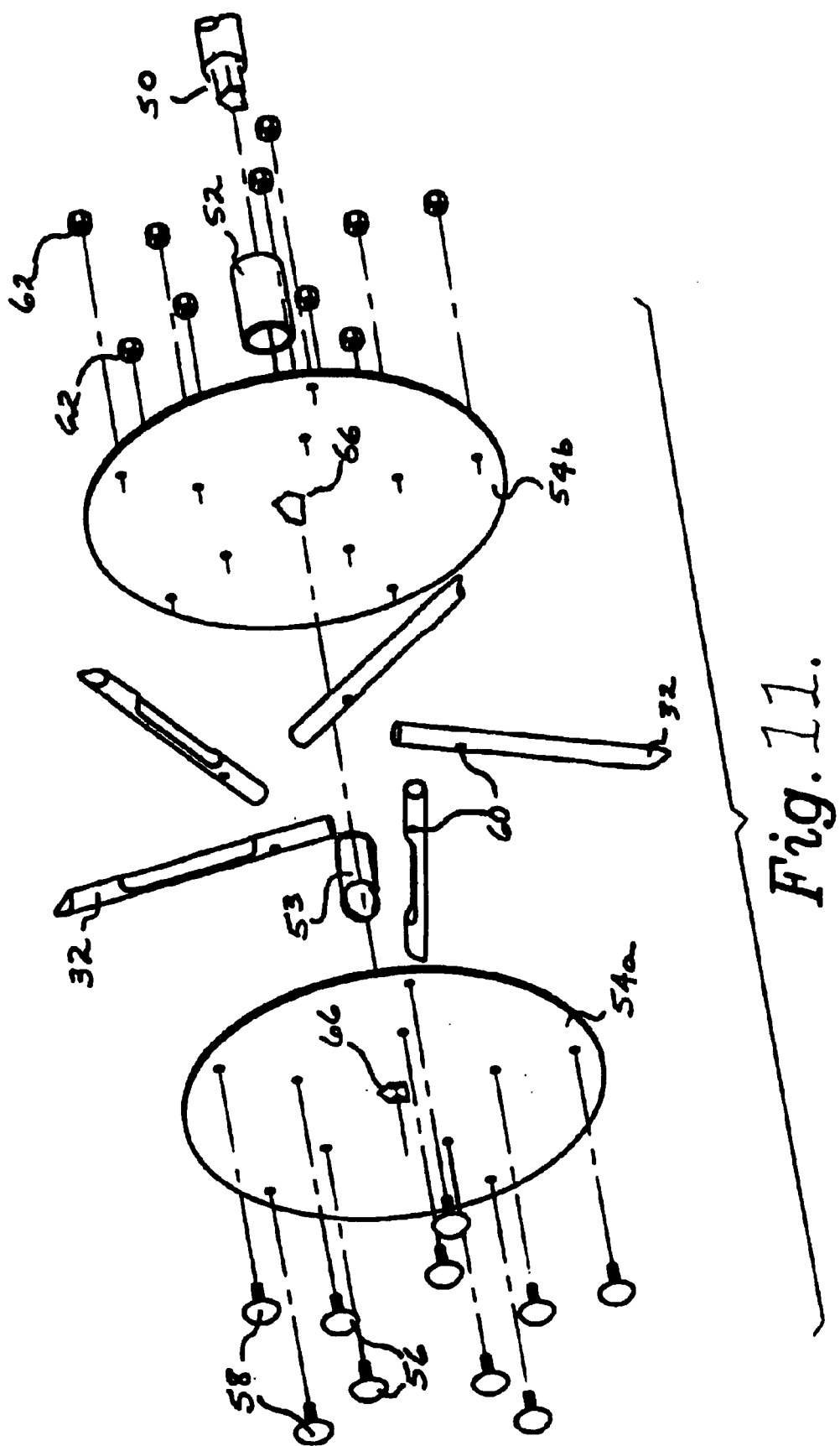
FIG. 11 is an exploded view of an alternative embodiment of the tine wheel shown in FIGS. 3 and 4 in which the shaft is pentagonal in cross-section.
Figure 12:
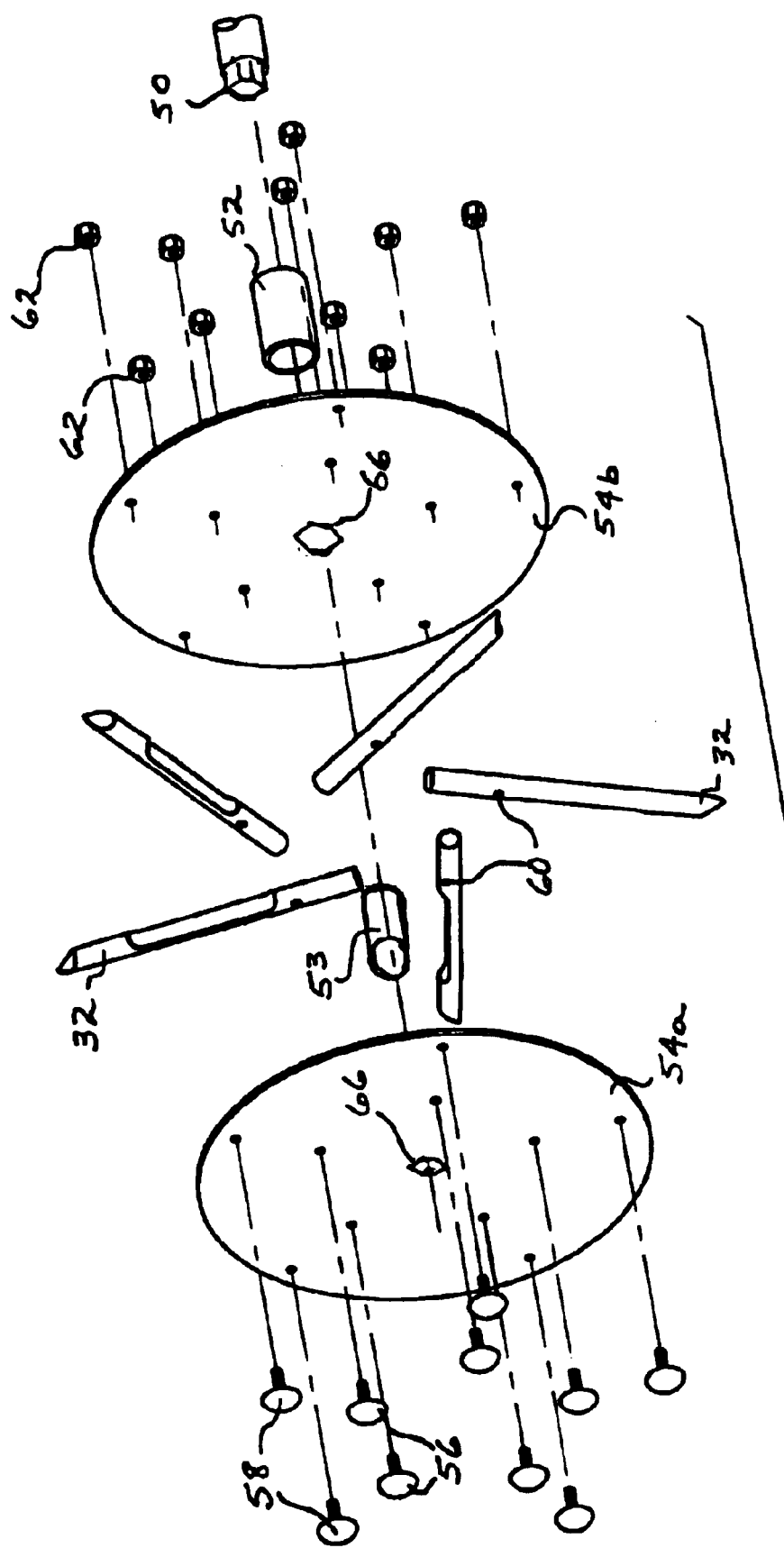
FIG. 12 is an exploded view of an alternative embodiment of the tine wheel shown in FIGS. 3 and 4 in which the shaft is hexagonal in cross-section.
Figure 13:
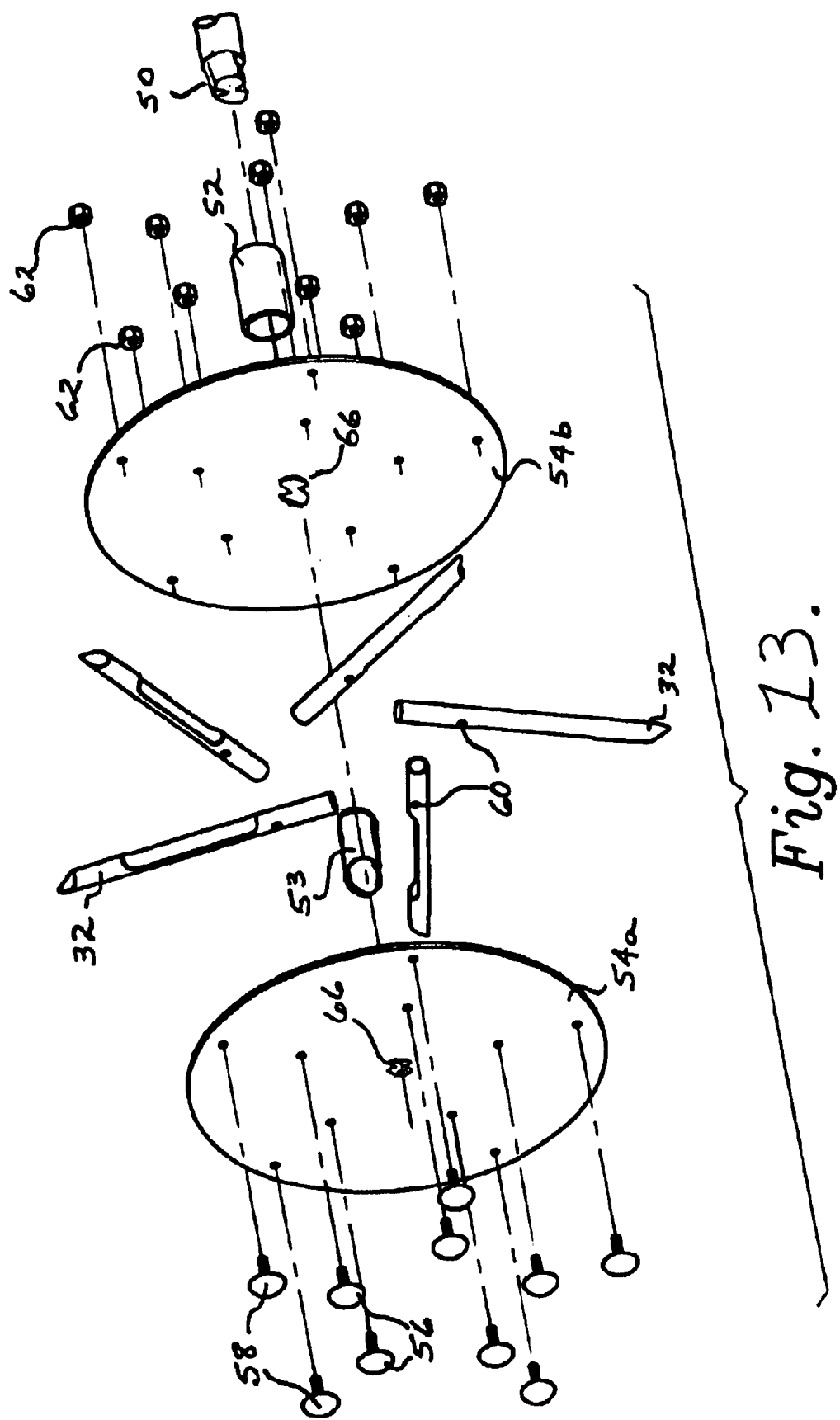
FIG. 13 is an exploded view of an alternative embodiment of the tine wheel shown in FIGS. 3 and 4 in which the shaft cross-section has multiple longitudinal grooves.

Referring now to FIGS. 4 and 10, each tine wheel 48 is assembled by securing each of tines 32 between tine lock plates 54a, 54b with mounting bolts 56 which pass through mounting void 60 of tine 32 and through the opposed tine lock plate 54 where the mounting bolt 56 is secured by a nut 62. When the tines have been mounted between lock plates 54, support bolts 58 are introduced to pass through tine lock plates 54 and also are secured with a nut 62. When the assembled tine wheel is to be mounted on shaft 50, shaft 50 is passed through drive engagement voids 66 of tine lock plates 54a, 54b. It will be appreciated that drive engagement void 66 shown in the embodiment of FIG. 4 is rectangular in shape to match shaft 50 which also is rectangular. This shaping of shaft 50 provides a power transferring means which communicates the rotational power of the shaft from to shaft to at least one of tine wheels 48 while avoiding the use of welded connections between the shaft 50 and the tine wheels 48. It will be appreciated that such welded or permanent connections between the shaft and the tine wheels or other device mounted on shaft 50 would prevent a user from being able to dismantle the tine wheels from the shaft to replace damages parts or to reconfigure the tine wheels on shaft 50. Alternate shapes such as hexagonal or pentagonal cross-section, or triangular cross-section as shown in FIGS. 10 through 12, or otherwise having longitudinal grooves as shown in FIG. 13, and which are effective for transferring power also could be used for shaft 50 and drive engagement void 66. Those skilled in the art will appreciate that a round shaft cross-section and a round engagement void 66 would not accomplish a transfer of power from shaft 50 to the tine wheel 48 which is slidably mounted thereon.

Figure 6:
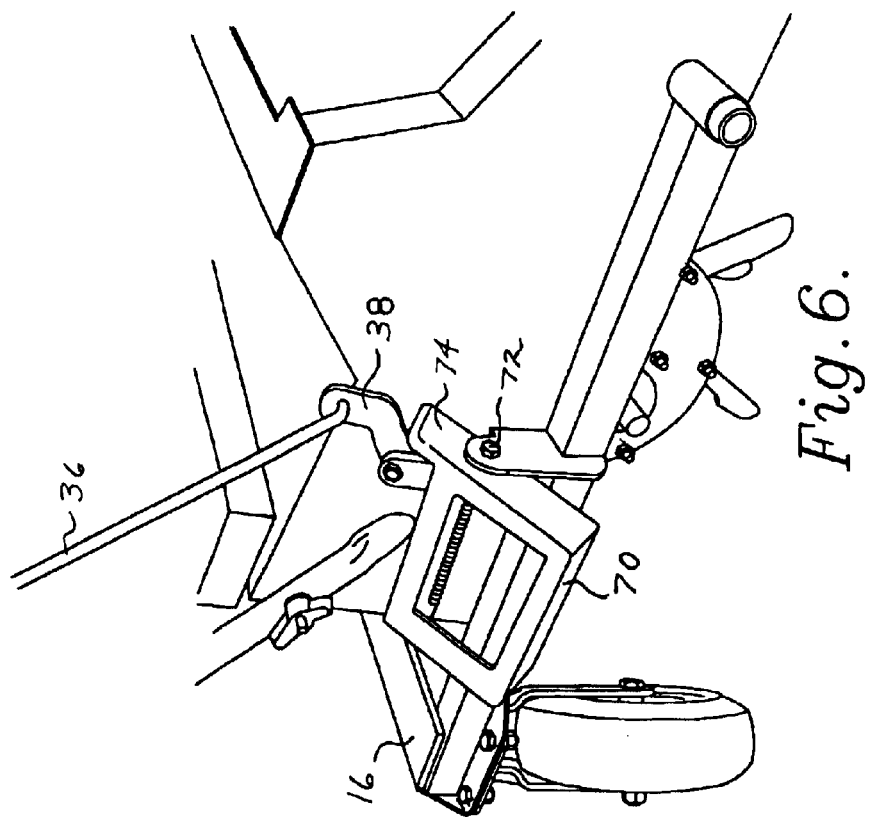
FIG. 6 shows the lift handle of the present invention engaged to assist in lifting the present invention.
Figure 5:
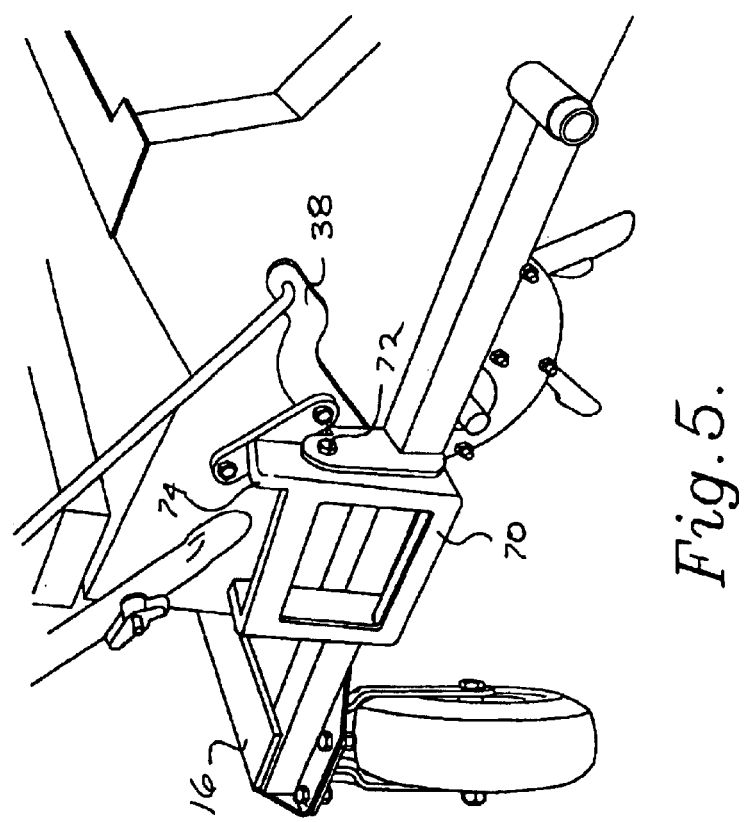
FIG. 5 shows the lift handle of the present invention when not engaged.

Referring now to FIGS. 5 and 6, a lift handle and lockout means will be described which permits the user to conveniently lift aerator 10 which is both a bulky and heavy object. Also the lift handle, simultaneously prevents rear frame 16 from collapsing against front frame 14 during the manual movement of aerator 10.

Referring now to FIG. 5, lift handle 70 is shown in its unused position in which it is pivoted against rear frame 16 of aerator 10. When the operator wishes to lift aerator 10 to place aerator 10 in the back of a vehicle or to lift aerator 10 over an obstacle such as a low wall or other obstruction, the user, after shutting down engine 24, pulls rearwardly on rear frame lift bar 34. This draws lift flange 38 into the position which lowers rear frame 16, thus effectively raising front frame 14 and tine wheel assembly 26 off the ground. The user then grasps lift handle 70 and pulls outwardly causing lift handle 70 to rotate around pivot 72 and place lockout flange 74 underneath lift flange 38. This prevents inadvertent shifting of lift flange 38 into the position which would raise rear frame 16 and which could result in the pinching of the fingers of the user's other hand or the fingers of another person who has placed their hands about rear frame 16 to assist in lifting aerator 10. Once aerator 10 has been moved into its new position, user simply releases lift handle 70 which pivots back into its at rest position shown in FIG. 5 and restores lift flange 38 to an operable mode.

Figure 8:
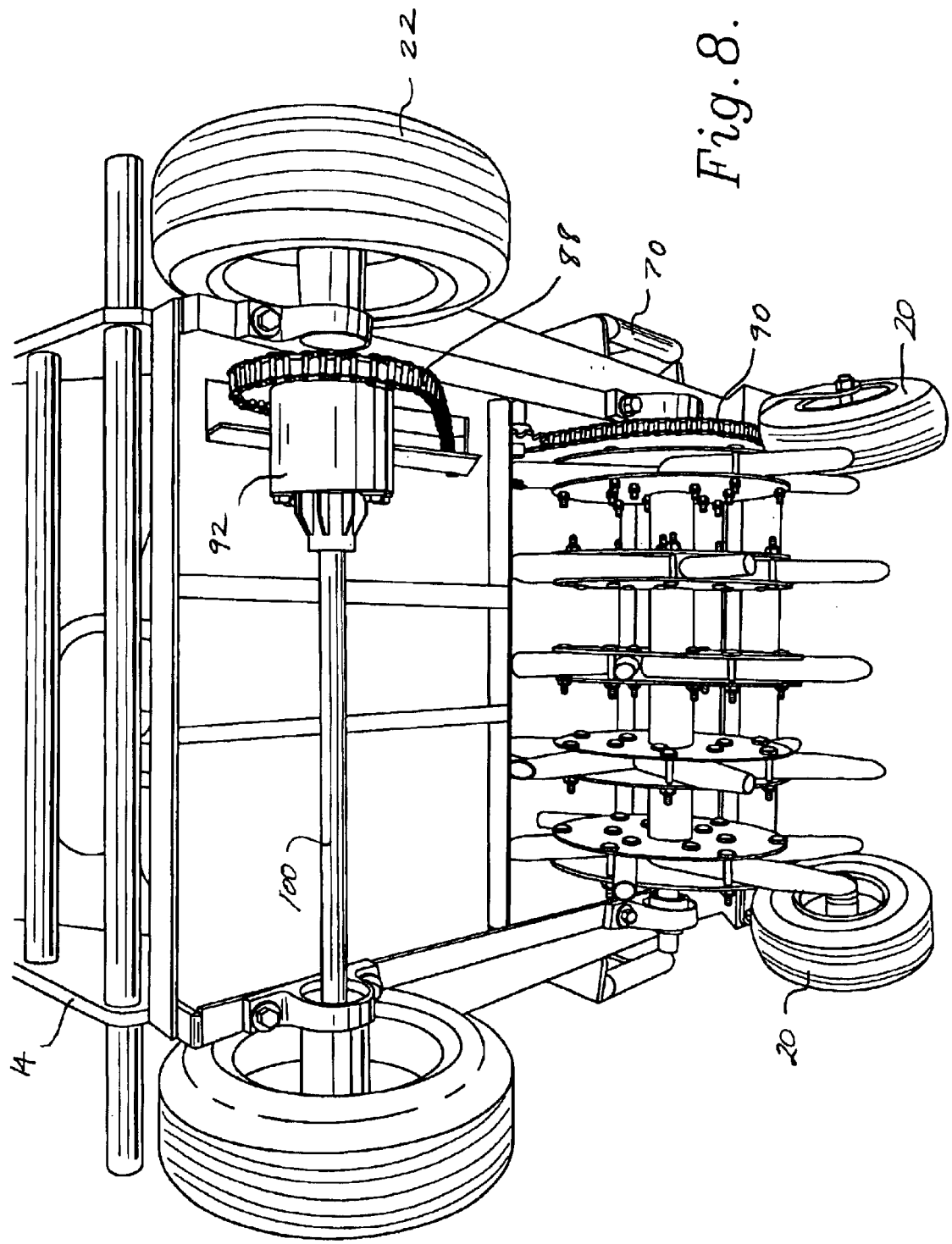
FIG. 8 is a front and bottom perspective view of the present invention showing the differential on the front axle of the present invention and showing the tine wheel assembly in position on the front frame of the present invention.

Referring now to FIGS. 7 and 8, the power train of the present invention will be described. As previously mentioned, the use of a front axle differential in combination with castered rear wheels assists in the maneuverability of aerator 10 and reduces the amount of effort required by the user to turn aerator 10 into a reverse path. This combination also reduces the turning radius required by the present invention as compared to other aerator devices. In FIG. 7, engine power takeoff pulley 80 is shown attached to engine 24. Belt 82 passes around engine power takeoff pulley 80 and transfers the power to drive shaft pulley 84 which is part of power shaft 86. Also mounted on power shaft 86 by means of gears are differential chain drive 88 and tine wheel assembly chain drive 90.

Figure 9:
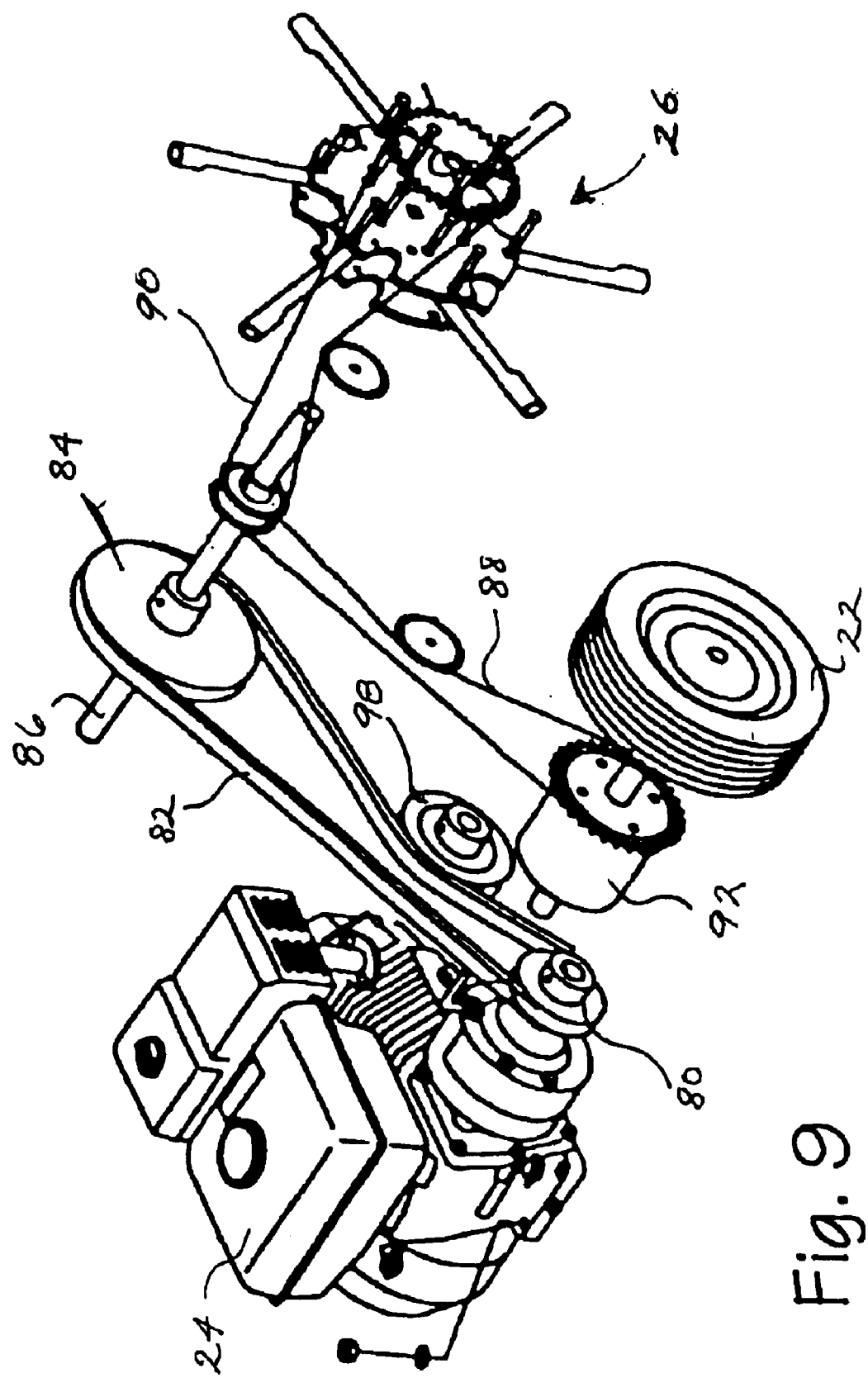
FIG. 9 is an exploded view of the engine and drive train of the present invention and showing the idler pulley and the connection of the drive chains to the differential and to the tine wheel assembly.

Referring to FIGS. 8 and 9, the connection of differential chain drive 88 is shown on differential 92 and the connection of tine wheel chain drive 90 is shown connecting to a gear which is a part of tine wheel assembly 26. It will be appreciated that engine power takeoff pulley 80 (FIG. 9) is always rotating when engine 24 is operating although use of engine throttle 40 may reduce or increase the amount of torque being applied to engine power takeoff pulley 80. Therefore, as shown in FIG. 9, to engage and disengage the transfer of power from engine power takeoff pulley 80 to drive pulley 84 an idler pulley 98 is used to compress belt 82 sufficiently to cause rotation of drive pulley 84 or to release tension on belt 82 and to provide enough slack that drive pulley 84 does not rotate. Referring to FIG. 7, the tensioning and release of idler pulley 98 is accomplished by the user compressing power engagement bar 42 (FIG. 1) against handle 12 which causes tension on cable 44 which is passed to spring 94 which pulls on idler pulley flange 96 and compresses idler pulley 98 against belt 82 to transfer power from engine power transfer pulley 80 to drive pulley 84.

It will be appreciated by those skilled in the art that at all times when drive pulley 84 is engaged, power is transferred to both tine wheel assembly 26 and to differential 92. This allows the user to better manipulate the path of travel of aerator 10 when tine wheel assembly is engaged in the ground and especially when the tine wheel assembly has been disengaged from the ground as previously described. The combination of differential 92 on front axle 100 of aerator 10 and the castered wheels at the rear of aerator 10 and the ability to mechanically raise the tine wheel assembly while having power to the front axle, provides the user with far greater maneuverability of aerator 10 than is available in other conventional aerators which either do not have a front axle having a differential or instead of a front axle have a large hollow drum, usually filled with water, to add weight to the aerator. In a typical circumstance, the prior art type of aerator using a weighted drum as a front axle or an axle not containing a differential will require a turning radius of 10 to 15 feet to reverse the direction of the aerator. The present invention reduces this turning radius to a distance of 2 to 5 feet depending upon the slope of the ground being worked.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described. Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the inventive aerator is constructed and used, the characteristics of the construction, and advantageous, new and useful results obtained; the new and useful structures, devices, elements, arrangements, parts and combinations, are set forth in the appended claims. It is also to be understood that the following claims are intended to cover all of the generic and specific features of the invention herein described, and all statements of the scope of the invention which, as a matter of language, might be said to fall therebetween.

What is claimed is:

1. A tine wheel assembly for use on a lawn aerator, said tine wheel assembly being assembled without welds, the assembly comprising:

a shaft, at least two tine wheel devices slidably mounted on said shaft, each of said tine wheel devices including at least one generally straight, hollow tine extending in a direction generally perpendicular to said shaft;

a spacer separating said at least two tine wheels, means for transferring rotational power from said shaft to each of said at least two tine wheels.

2. The aerator as claimed in claim 1 wherein said means for transferring rotational power comprises said shaft having a cross-sectional shape which transfers rotational power from said shaft to a device slidably mounted on said shaft.

3. The method as claimed in claim 2 wherein said shaft shape is triangular in cross section.

4. The tine wheel assembly as claimed in claim 2 wherein said shaft shape is hexagonal in cross section.

5. The tine wheel assembly as claimed in claim 2 wherein said shaft shape is square in cross section.

6. The tine wheel assembly as claimed in claimed 2 wherein said shaft shape is pentagonal in cross section.

7. The tine wheel assembly as claimed in claim 2 wherein said shaft shape in cross section comprises multiple longitudinal grooves in said shaft.

8. A tine wheel assembly comprising:
   a shaft, said shaft having a cross-sectional shape which transfers rotational power from said shaft to a device slidably mounted on said shaft;
   a tine wheel device for slidable mounting on said shaft comprising:
      first and second tine lock plates, each of said first and second tine lock plates having a void therein, said void being shaped to allow slidable mounting of said lock plate on said shaft,
      at least one tine engaging said lock plates, said at least one tine being secured without the use of a weld, and
      at least one of said first and second tine lock plates voids having a shape complementary to said shaft cross-sectional shape to allow transfer of rotational power from said shaft to said lock plate.

9. The tine wheel assembly as claimed in claim 8 wherein said shaft shape is triangular in cross section.

10. The tine wheel assembly as claimed in claim 8 wherein said shaft shape is hexagonal in cross section.

11. The tine wheel assembly as claimed in claim 8 wherein said shaft shape is square in cross section.

12. The tine wheel assembly as claimed in claim 8 wherein said shaft shape is pentagonal in cross section.

13. The tine wheel assembly as claimed in claim 8 wherein said shaft shape in cross section comprises multiple longitudinal grooves in said shaft.

14. A method of constructing a tine wheel assembly for an aerator comprising:

providing a shaft having a cross-sectional shape to allow transfer of rotational power from said shaft to a device slidably mounted on said shaft;

slideably mounting a tine wheel device on said shaft, said tine wheel device being assembled by the method comprising:
   providing first and second tine lock plates, each of said first and second tine lock plates having a void therein, said void being shaped to allow slidable mounting of said lock plate on said shaft, at least one of said first and second tine lock plates voids having a shape complementary to said shaft cross-sectional shape to allow transfer of rotational power from said shaft to said lock plate,
   engaging at least one tine with said lock plates, said at least one tine being secured without the use a weld to form a tine wheel device.

15. The method as claimed in claim 14 wherein said shaft shape is triangular in cross section.

16. The method as claimed in claim 14 wherein said shaft shape is hexagonal in cross section.

17. The method as claimed in claim 14 wherein said shaft shape is square in cross section.

18. The method as claimed in claim 14 wherein said shaft shape is pentagonal in cross section.

19. The method as claimed in claim 14 wherein said shaft shape in cross section comprises multiple longitudinal grooves in said shaft.

20. A tine wheel assembly for use on a lawn aerator, said tine wheel assembly being assembled without welds, the assembly comprising:
   a shaft,
   at least two tine wheel devices slidably mounted on said shaft, each of said tine wheel devices including at least one generally straight, spike tine extending in a direction generally perpendicular to said shaft;
   a spacer separating said at least two tine wheels, said spacer including an outer diameter that is smaller than outer diameters of said at least two tine wheel devices,
   means for transferring rotational power from said shaft to each of said at least two tine wheels.

* * * * *